United States Patent

[11] 3,581,920

| [72] | Inventors | Gunter Strocker |
| | | Holzwickede; |
| | | Gerhard Fischer, Dortmund-Kirchhorde, |
| | | both of, Germany |
| [21] | Appl. No. | 796,088 |
| [22] | Filed | Feb. 3, 1969 |
| [45] | Patented | June 1, 1971 |
| [73] | Assignee | Gustav Schade Machinenfabrik |
| | | Dortmund, am Rosenplatzchen, Germany |
| [32] | Priority | Jan. 23, 1969 |
| [33] | | Germany |
| [31] | | P 12 81 942.0 |

[54] METHODS OF MIXING DIFFERENT BULK MATERIALS
3 Claims, 3 Drawing Figs.

[52] U.S. Cl. .................................................. 214/152, 214/10
[51] Int. Cl. .................................................. B65g 59/00
[50] Field of Search .......................................... 198/36; 214/10, 152; 259/180; 37/190

[56] References Cited
UNITED STATES PATENTS

| 3,233,877 | 2/1966 | Kelly | 214/10X |
| 3,506,146 | 4/1970 | Parigot et al | 214/152 |
| 662,063 | 11/1900 | Edison | (214/152UX) |
| 677,677 | 7/1901 | Messiter | 198/36X |
| 1,026,444 | 5/1912 | Hunt | 214/10 |

FOREIGN PATENTS

| 949,220 | 9/1956 | Germany | 214/10 |
| 648,720 | 11/1962 | Italy | 214/10 |

Primary Examiner—Gerald M. Forlenza
Assistant Examiner—Frank E. Werner
Attorney—Meyer, Tilberry and Body ABSTRACT: A method of mixing different bulk materials includes the formation of a dump pile made up of a plurality of layers of different material. Each layer extends from the base of the pile to the surface thereof. Material is then removed by scraping along the surface of the pile transversely of the layers so that the removed material comprises a mixture of material of each layer outcropping at the surface of the pile.

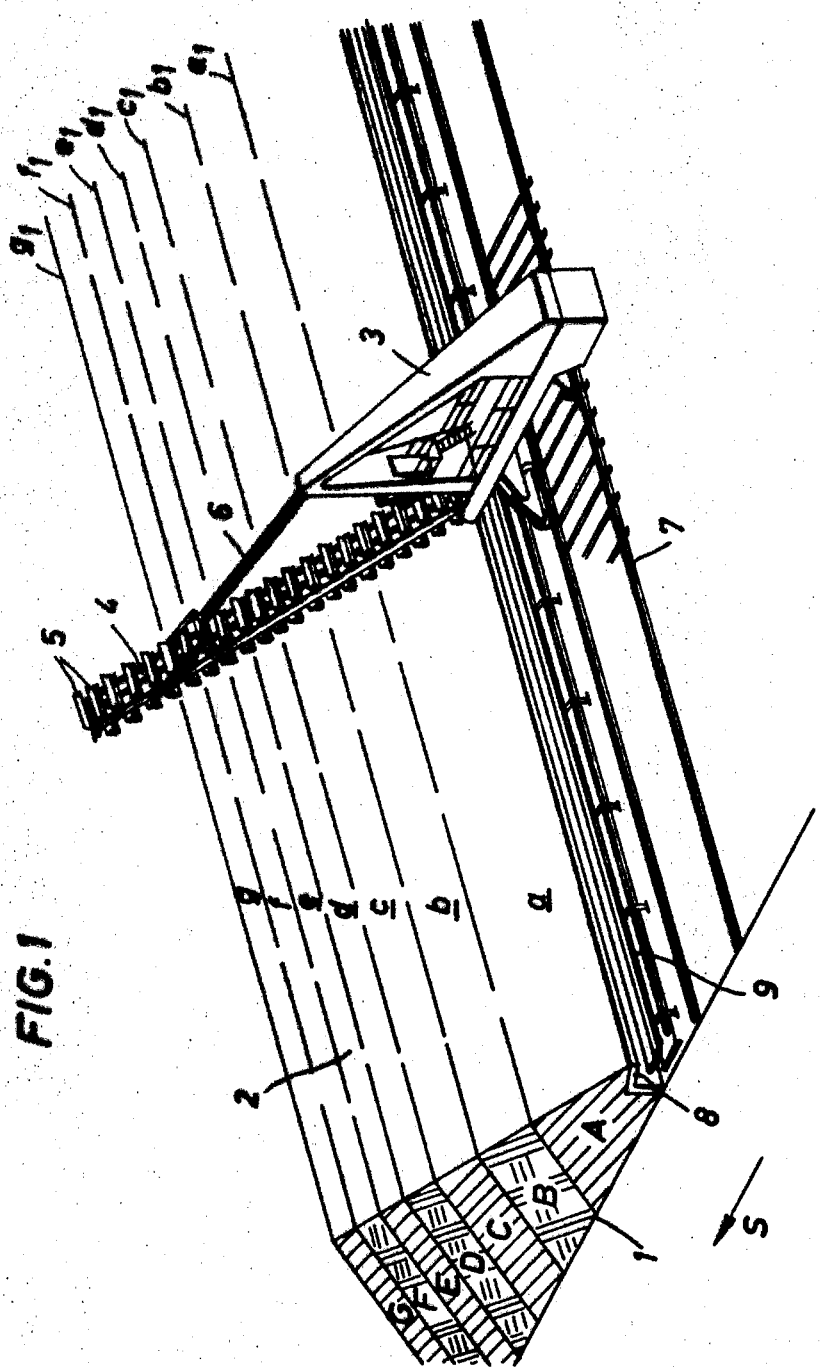

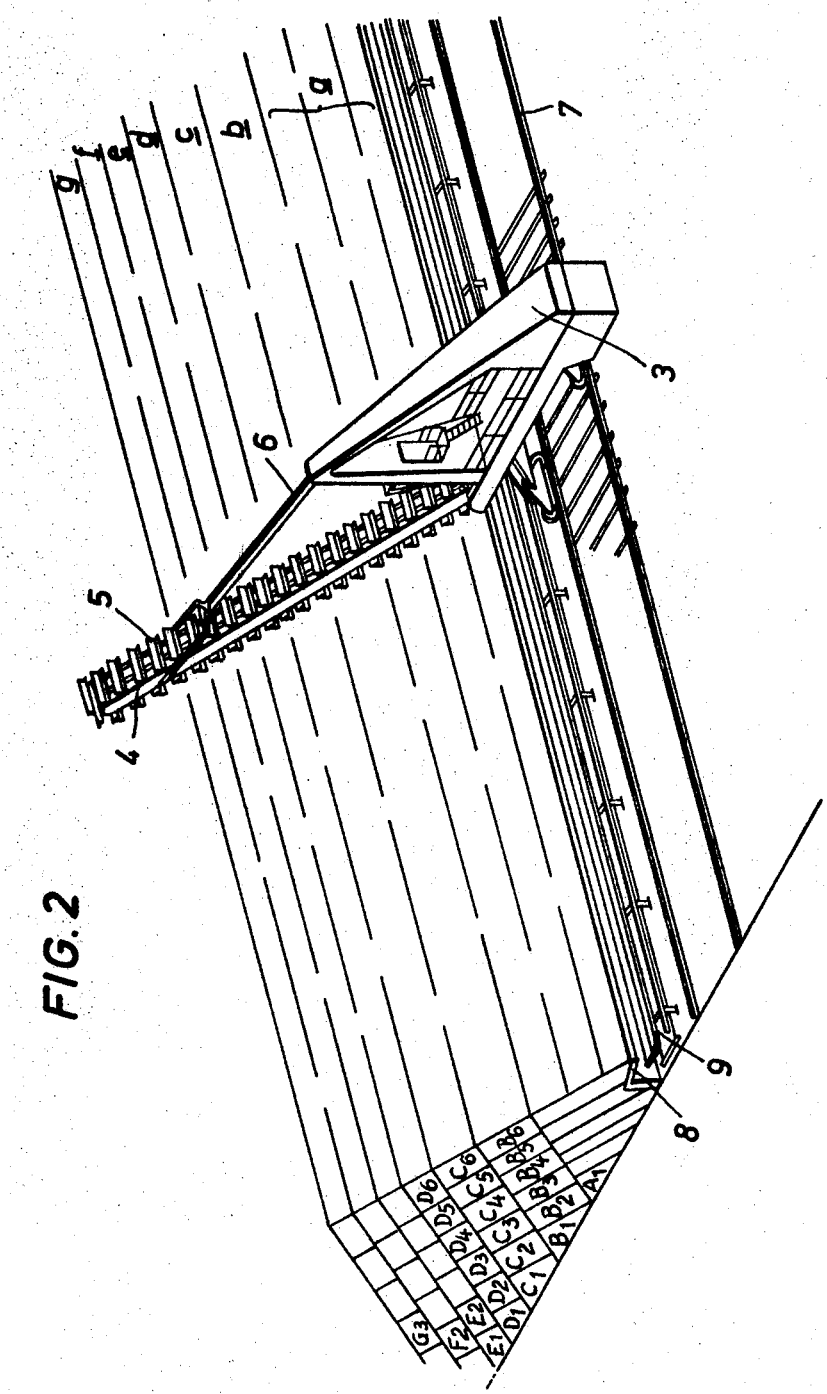

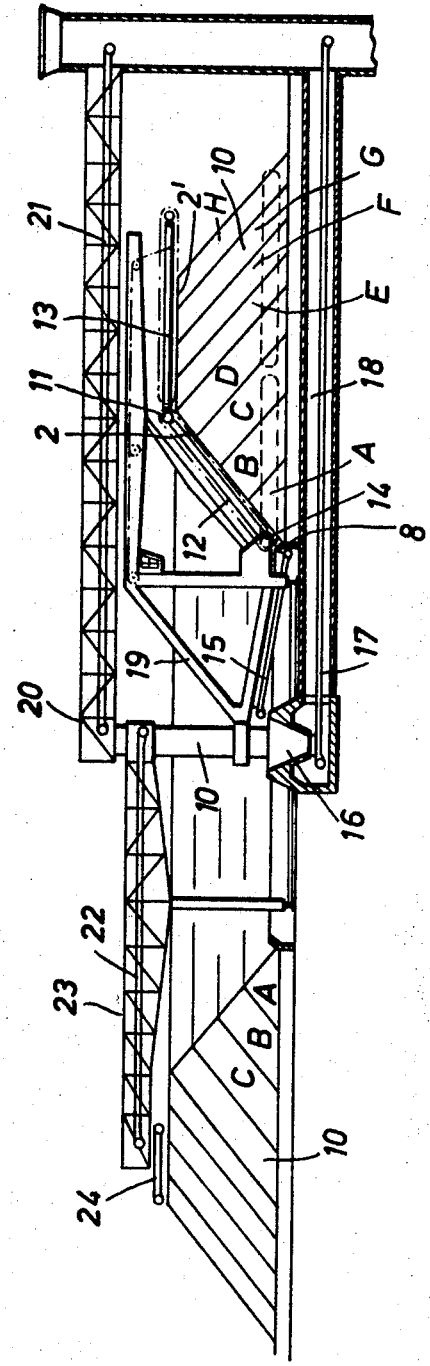

METHODS OF MIXING DIFFERENT BULK MATERIALS

DISCLOSURE

The present invention relates to a method of mixing different bulk materials which have been deposited by a dumping unit in substantially parallel, superimposed strata each containing only one specific kind of bulk material and inclined at the angle of repose of the dump, said strata having constant sections over the length of a dump and subsequently being removed from the dump by means of a clearing device traversing along it.

In known mixing techniques of this kind, the devices used for clearing the material from the dumps are designed so that they operate from one end of the dump. With devices of this kind, which are equipped with a scraper boom swinging over the end face of the dump or traversing backwards and forwards along it, however, it is impossible to achieve uniform mixing of the various kinds of bulk materials contained in the form of strata or layers in the dump, because the boom in executing the reciprocating or swinging motion, does not, at any given instant, engage and remove all the layers of material over the full width. Also, the feed rate achievable with these kinds of devices is subjected to continuous fluctuation within wide limits because, due to the pivoting or reciprocating mode of movement, the area of the dump slope which is covered by the scraper boom continuously changes.

Bucket wheels or drums have already been tried, these likewise working the end face of the dump and being associated with a rake or harrow moved backwards and forwards over the slope of the dump, this harrow releasing the bulk material from the slope of the dump so that it can be picked up by the buckets of the wheel or drum etc. and transported away. With equipment of this kind, the kind of mixing effect which is achievable is adequate for many purposes. However, the system is an extremely heavy and expensive one, and requires a great deal of maintenance.

These known methods, employing clearing devices which work the end face of the dump, are open to the common objection that they occupy too much ground area because in order to replenish the dump with bulk materials, the clearing equipment first of all has to be traversed back to the initial position.

Overall, it can be stated that in the past numerous attempts have been made to clear bulk materials (such as ores, coal and the like) stored in dumps, in the form of mixtures of predetermined ratio, by using the simplest possible kinds of clearing equipment, but that hitherto none of these attempts has thus far been entirely successful. Insofar as it was ever possible to obtain satisfactory mixing, other disadvantages had to be accepted, in particular the disadvantage of a high outlay in machinery together with poor exploitation of available space.

The present invention now indicates a way in which an optimum mixing effect can be achieved coupled with comparatively small outlay in terms of equipment, with high mobility and with excellent exploitation of available space.

The method in accordance with the present invention is distinguished by the fact that the various kinds of bulk materials are deposited in layers in the dump in such a fashion that, considering the dump in cross section, each layer of material extends from the base of the dump to the surface thereof, and that in order to clear the materials from the dump a device is used, preferably a known kind of dump scraper, which, using its scraper boom which is pivotable in a vertical plane and pivots about an axis located at the base of the dump, simultaneously engages that surface region of the dump cross section at which all the layers of bulk material appear in band form, and, during the clearing operation, traverses along the side of the dump with the boom at a constant height, the boom being lowered by the amount of the depth of cut, after each pass.

In order to feed in the various bulk materials, in known fashion a swiveling dumper can be employed which, as mentioned hereinbefore, lays down the various bulk materials which are to be mixed, in inclined parallel superimposed layers, whose inclination is that of the natural angle of repose of the material, and which furthermore advantageously forms a structural unit with the clearing device traversing along the dump, the latter device preferably in the form of a scraper system. In the latter case, the outlay in terms of equipment is particularly low. Using devices of this sort which work along the side of the dump, the bulk material can be selectively cleared in practically any mix ratio, the ratio being proportional to the size of the cross-sectional areas of the individual layers of bulk material.

A still better mix ratio, in terms too of grain size, can be achieved if, in accordance with a further feature of the invention, each of the inclined layers of bulk material extending from the base of the dump to the surface thereof, is in turn subdivided vertically into several superimposed bands all of the same material. In this case, during the clearing operation the coarser grains or particles do not predominantly collect in the layers near the base of the dump, but are distributed substantially uniformly over the entire layer cross section so that during subsequent clearing a uniform mixture is achieved in terms of grain size as well.

In triangular-section dumps, the clearing device exclusively works that slope of the dump at which the individual layers of bulk material appear at the surface. In trapezium-section dumps, the clearing device will at the same time also work the top substantially horizontal surface, at which the individual layers of material are likewise exposed. This can particularly advantageously be carried out by means of a scraper loader equipped with a folding boom. In the case of round silos or ring-shaped dumps, the same principle applies except that the clearing device in this case does not travel along the dump but rotates during the clearing operation about the center point of the dump.

The invention will now be described making reference to the drawings which illustrate the invention but in no restrictive sense.

FIG. 1 illustrates pictorially a triangular-section dump with a clearing device in the form of a scraper loader;

FIG. 2 illustrates the system of FIG. 1, in which the layers of bulk material of which the dump is constituted, are in turn made up of a number of individual layers;

FIG. 3 illustrates in elevation, and partially in section, a ring-shaped dump with a combined input and clearing device equipped with a folding boom.

In FIG. 1, a triangular-section dump of bulk material is illustrated, consisting of the layers $a$ to $g$ whose cross-sectional areas are marked A to G. Each layer $a$ to $g$ constitutes a bulk material of specific kind. Thus, the dump includes a total of seven layers of different bulk materials. Each layer of bulk material rests upon the base 1 of the dump. The layers extend in section from the dump base to the slope 2 of the dump where they appear in the form of a banded structure. The individual layers of bulk material extend along the full length of the dump. They have constant thickness over this length. The dumping of the bulk materials is effected, for example, by means of a dumping conveyor (not shown) which first of all deposits the layer $a$ of cross section A. Subsequently, the point of discharge of the dumping conveyor is shifted in the direction of the arrow S from the apex line $a1$ to the apex line $b1$ and the second type of bulk material then deposited, forming the layer $b$ which rests upon the slope of the layer $a$. This procedure is repeated until the complete dump has been built up with the layers $a$ to $g$.

In order to clear the bulk materials thus deposited in the dump, in accordance with FIG. 1 a dump scraper 3 of known design is employed, having a scraper boom 4 with rake elements 5 attached to circulating chains. The boom is articulated at its bottom end so that it can be raised and lowered in the vertical plane by lifting gears.

The scraper runs on rails 7 laid at the base of the dump and parallel thereto, in front of the slope 2. Between the rails 7 and a dump boundary wall on which a platform 8 is formed, a conveyor belt 9 for removing the material is placed, and this too extends along the length of the dump.

During the clearing operation, the scraper travels along the dump on the rails 7, its boom 4 being lowered in such a way that the rakes 5 remove the material, in accordance with the particular depth of cut set, from that slope of the dump at which the banding of the layers $a$ to $g$ appears, and convey it over the platform surface 8 onto the conveyor belt 9. During the passage of the scraper along the dump, the depth of penetration of the rake elements is constant. It is only for the next pass (return pass) that the boom is lowered by an amount corresponding to the depth of penetration. It will be clear that the scraper boom 4 simultaneously engages the slope 2 over its full height and thus cuts a strip of material from each of the layers $a$ to $g$. Accordingly, the bulk materials of the various layers $a$ to $g$ are mixed in an accurate ratio; the mix ratio between the bulk material components $S1$, $S2$, $X3$ etc. is in the relationship $X1 : X2 : X3$ etc. $= A : B : C$ etc. depending upon the ratio between the cross-sectional areas A, B, C etc. of the individual layers. By appropriate control of the dumping of the bulk material in the aforedescribed fashion, the ratio can be accurately adjusted.

During the dumping of the bulk materials, it may happen that within the individual layers $a$ to $g$ there is some unmixing of the material in terms of grain size, in the sense that the coarser grains tend to predominate in the neighborhood of the base 1 of the dump. To prevent this happening and also to achieve uniform distribution in terms of grain size, in accordance with FIG. 2 each layer $a$ to $g$ is split into a number of superimposed layers of one and the same material so that, viewed in cross section, the areas A, B, C etc. are composed of the subsidiary areas A1, A2, A3 etc. and B1, B2, B3 etc. etc. Accordingly, for each layer $a$ to $g$ the dumping equipment or discharge device must traverse several times along the dump, each pass forming a subsidiary layer. For the rest, the dumping of the material takes place in the manner already described.

The arrangement of FIG. 3 is distinguished from the arrangements thus far described, substantially by the fact that a ring-shaped dump 10 of trapezoidal cross section is provided, this being made up of the various bulk material layers A to H. In order to clear the material, a scraper loader is used which is capable of swiveling about a pillar 1 set up in the center of the ring-shaped dump. The scraper loader employs a scraper boom consisting of the two sections 12 and 13 which are linked with one another through a horizontal joint 11, the section 12 being mounted to pivot in the vertical plane about the joint 14 located near the base of the dump. The boom section 12 thus works the slope 2 at which the layers $a$ to $d$ with the cross-sectional areas A to D, appear, whilst the boom section 13 works the top horizontal surface 2' of the dump, at which the layers $e$ to $h$ with the cross-sectional areas E to H, are exposed. It can be seen straight away that here, too, at any instant all the layers $a$ to $h$ will be simultaneously engaged by the boom so that the different bulk materials will be removed in the prescribed manner and mixed. The material removed from the dump is fed over an intermediate conveyor 15 and a central feed hopper 16 to a conveyor belt 17 which is arranged in a radially disposed duct 18. During operation, i.e. during the swiveling of the boom about the central pillar 10, the depth of cut of the two boom sections 12 and 13 remains constant of course. It is only after a complete revolution that both boom sections are lowered by an amount corresponding to the depth of cut, whereupon the process is repeated.

The folding boom is here mounted on a structure 19 which can swivel around the central pillar. The central pillar is connected to a radially disposed conveyor bridge 20 carrying a feed conveyor 21 over which the bulk material for dumping is supplied. The conveyor belt 21 passes the bulk material to a dumping conveyor 22 arranged upon a bridge structure 23 likewise able to swivel around the central column 10. The bulk material is then dumped in the form of the layers $aa$ to $h$, using a reversible conveyor 24.

As can be seen, the dumping of the various bulk materials and their subsequent clearing can be carried out herein substantially the same manner as in the arrangement of FIG. 1. It is also entirely possible in the case of this ring-shaped dump, to make up the layers of bulk material in the form of individual subsidiary layers, as described in relation to FIG. 2.

We claim:

1. A method of mixing a plurality of different bulk materials comprising the steps of depositing a plurality of different materials layer-by-layer to form a dump pile having a transverse dimension and a length dimension, said dump pile having a base and an upwardly facing surface extending along the entire length thereof, each layer of different material being deposited to extend from the base of the dump pile to the upwardly facing surface thereof and being exposed at the upwardly facing surface thereof along the entire length of the dump pile, each of said layers being inclined at the angle of repose of the bulk materials and having a substantially constant cross-sectional area throughout the length of the dump pile, and removing a mixture of said bulk materials from said dump pile by scraping material from the upwardly facing surface thereof transversely of said dump pile and of the layers to simultaneously remove a portion of each of said layers from the upwardly facing surface of said dump pile, and progressively continuing said scraping along the length of said dump pile.

2. The method of claim 1, wherein said upwardly facing surface includes a top surface and a side surface and said step of removing a mixture of said bulk materials from said dump pile is carried out by simultaneously scraping material from both said top and side surfaces transversely of said dump pile.

3. The method of claim 1, and further including the step of arranging said layers of different material by laying down sublayers of the same material in each layer in a plurality of separate passes.